(12) United States Patent
Tsuneoka

(10) Patent No.: US 11,793,123 B2
(45) Date of Patent: Oct. 24, 2023

(54) POT STAND

(71) Applicant: Cotte Co., Ltd., Nagoya (JP)

(72) Inventor: Daishi Tsuneoka, Nagoya (JP)

(73) Assignee: COTTE CO., LTD., Nagoya (JP)

( * ) Notice: Subject to any disclaimer, the term of this patent is extended or adjusted under 35 U.S.C. 154(b) by 472 days.

(21) Appl. No.: 17/057,819

(22) PCT Filed: Sep. 30, 2019

(86) PCT No.: PCT/JP2019/038586
§ 371 (c)(1),
(2) Date: Nov. 23, 2020

(87) PCT Pub. No.: WO2020/110454
PCT Pub. Date: Jun. 4, 2020

(65) Prior Publication Data
US 2021/0195848 A1 Jul. 1, 2021

(30) Foreign Application Priority Data

Nov. 27, 2018 (JP) .................................. 2018-220843

(51) Int. Cl.
A01G 9/04 (2006.01)
A47G 7/04 (2006.01)

(52) U.S. Cl.
CPC ............... *A01G 9/04* (2013.01); *A47G 7/041* (2013.01)

(58) Field of Classification Search
CPC ........ A01G 27/006; A01G 9/04; A01G 9/042; A47G 7/02; A47G 7/041
See application file for complete search history.

(56) References Cited

U.S. PATENT DOCUMENTS

| 5,535,546 A * | 7/1996 | Krivonos ............... A47G 7/041 220/23.6 |
| 6,385,899 B1 * | 5/2002 | Treganza ............... A47G 7/041 47/66.6 |

(Continued)

FOREIGN PATENT DOCUMENTS

| JP | 58176748 U | 11/1983 |
| JP | 05063241 U | 8/1993 |

(Continued)

OTHER PUBLICATIONS

International Search Report from International Application No. PCT/JP2019/038586 dated Nov. 19, 2019.

(Continued)

*Primary Examiner* — Monica L Perry
(74) *Attorney, Agent, or Firm* — Shih IP Law Group, PLLC

(57) ABSTRACT

A pot stand is provided that is capable of being simply used, receiving drained water without causing water leakage, reducing manufacturing cost and enables easy disposition of the drained water. The pot stand includes a main body, a water reservoir and a load receiving part. The main body includes an upper surface part that has a drain hole, a side surface part that supports the upper surface part and has a space opened upwardly, and a bottom surface part that is connected to the side surface part. The pot stand further includes an opening that is formed in a part of the side surface part and ribs that are provided in an inner side of the main body. The water reservoir is slidably movable through the opening to be taken in or out from the space. The load receiving part is a standing wall-like shaped and extends from the bottom surface part in the space.

9 Claims, 16 Drawing Sheets

(56) References Cited

U.S. PATENT DOCUMENTS

| | | | |
|---|---|---|---|
| 2008/0083163 A1* | 4/2008 | Amsellem | A01G 9/042 47/79 |
| 2011/0000132 A1* | 1/2011 | Kamau | A01G 9/02 47/66.7 |
| 2012/0047801 A1* | 3/2012 | Hogan | A01G 9/022 47/65.5 |
| 2015/0007497 A1 | 1/2015 | Delp, II | |
| 2016/0128282 A1* | 5/2016 | Halferty | A01G 9/04 47/71 |
| 2018/0228100 A1* | 8/2018 | Gergek | A01G 27/06 |
| 2022/0174888 A1* | 6/2022 | Tsuneoka | A01G 9/042 |

FOREIGN PATENT DOCUMENTS

| | | | |
|---|---|---|---|
| JP | 08280266 A | 10/1996 | |
| JP | 2001269237 A | 10/2001 | |
| JP | 2001346451 A | 12/2001 | |
| JP | 2002065072 A | 3/2002 | |
| JP | 2014079174 A | 5/2014 | |
| JP | 2018174820 A | 11/2018 | |
| KR | 200260726 Y1 | 1/2002 | |
| KR | 20130033637 A1 | 4/2013 | |
| WO | 2018190045 A1 | 10/2018 | |

OTHER PUBLICATIONS

"Building Process Evaluation Basics", Writing Group for manual of evaluation and examination for National Registered Asset, Beijing: China Finance and Economic Publisher, Mar. 2004, 6 pages.

\* cited by examiner

POT STAND

TECHNICAL FIELD

The present disclosure relates to a pot stand that enables easy disposition of water drained from a bottom of a pot in watering to a potted plant such as a foliage plant.

BACKGROUND

Patent Literature 1 discloses a water reserving-type pot stand with a water collecting tray that receives drained water. The pot stand of Patent Literature 1 includes a pot mounting part in a shape of covering a bottom of a pot and having a hole at a center thereof. The pot stand further includes a funnel-shaped saucer that is provided in correspondence to the hole. After watering to a plant, water drained from the bottom of the pot flows down through the funnel-shaped saucer to the water collecting tray that is positioned under the funnel-shaped saucer.

Patent Literature 2 discloses a pot stand that includes a pot mount having a hole, a packing in a shape of inverse cone that fits to the hole, and a water reservoir that is provided under the mount.

CITATION LIST

Patent Literature

Patent Literature 1: JP2001-346451A
Patent Literature 2: WO 2018/190045A1

SUMMARY

Technical Problem

The pot stands disclosed in Patent Literatures 1 and 2, however, do not withstand a load of a heavy pot that is put on the saucer. The heavy pot bends the saucer downward and makes the stand unstable, which causes difficulty in use of the stand. This can be addressed by increasing a thickness of the saucer to enhance the strength of the stand, which causes inconveniences such as increases of thickness and size of the whole product.

It is an object of the present disclosure to provide a pot stand that improves load bearing capacity of a saucer to avoid bending of the saucer on which a pot is mounted.

Solution to Problem

In one aspect of the present disclosure, a pot stand includes a main body, a water reservoir and a load receiving part. The main body includes an upper surface part that has a drain hole, a side surface part that is located below the upper surface part, and a bottom surface part that is located below the side surface part. The side surface part includes an opening. The water reservoir is positioned in the main body and is movably taken out with respect to the main body. The load receiving part supports a load of a pot through the upper surface part. The load receiving part has a wall shape and extends vertically with respect to the bottom surface part along a take-out direction of the water reservoir. The water reservoir includes a long groove that is formed by recessing a wall of the water reservoir inwardly at back side, and the load receiving part fits in an inner space of the long groove in a state of the water reservoir being accommodated in the main body. The "wall shape" includes a vertical plate-like shape and a rib-like shape.

A water drained from the pot falls down to the water reservoir through the drain hole and is reserved there. The load receiving part located under the upper surface part supports the load of the pot. The water reservoir is taken out to drain the water.

The load receiving part supports the load of the pot such that the drained water is received irrespective of the weight of the pot. The structure is simple, thereby saving the manufacturing cost.

The pot stand may be made of natural wood, plywood, synthetic resin, ceramics, and metals such as stainless steel.

The "upper surface part" may have a flat surface or a curved surface. The upper surface part preferably has a downward inclination toward a periphery of the drain hole in an area from an outer periphery of the upper surface part to the periphery of the drain hole. The inclination may start from the outer periphery of the upper surface part or may start from a middle of the upper surface part to have a partial inclination. The position of the inclination is not restrictive. The upper surface part may be formed integrally with or separately from the side surface part.

The "load receiving part" is a rigid solid having dimensions in a thickness direction, width direction, and height direction. The "load receiving part" supports the load of the pot on a surface thereof through the upper surface part. The "load receiving part" may be positioned in the center or may be positioned separately on left and right sides. The water drained from the pot falls on the upper surface part on which the pot is mounted. The drained water then falls into the water reservoir through the drain hole. The load receiving part supports the load of the pot through the upper surface part.

Preferably, the long groove has a corresponding shape to the load receiving part in a plan view. The "corresponding shape" may include a similar shape, as an example. The "long groove" may be formed by recessing a wall of the water reservoir inwardly.

In another aspect of the present disclosure, a pot stand includes a main body, a water reservoir and a load receiving part. The main body includes an upper surface part that has a drain hole, a side surface part that is located below the upper surface part, and a bottom surface part that is located below the side surface part. The side surface part includes an opening. The water reservoir is positioned in the main body and is movably taken out with respect to the main body. The load receiving part supports a load of a pot through the upper surface part. The load receiving part has a column shape which extends vertically with respect to the bottom surface part along a take-out direction of the water reservoir. The water reservoir includes a long groove that is formed by recessing a wall of the water reservoir inwardly at back side. The load receiving part fits in an inner space of the long groove in a state of the water reservoir being accommodated in the main body. The "column shape" may include a shape of round column or rectangular column a plurality of which are preferably located at intervals.

In a further aspect of the present disclosure, the pot stand further includes a flow dividing plate. The flow dividing plate is mounted in the drain hole of the upper surface part to cover over the load receiving part. The flow dividing plate has an inclination and is configured to divide drained water and allow the water to fall down to the water reservoir. The flow dividing plate is configured to divide the drain hole of the upper surface part into a plurality of holes, and preferably has a raised center. The "plurality" of holes includes two or more drain holes. The "center" indicates the center in a longitudinal direction of the plate or the center in a width direction of the plate, and the center in the longitudinal direction of the plate is preferable. An upper surface of the load receiving part may or may not abut on an undersurface of the flow dividing plate. The upper surface of the load receiving part may abut on the undersurface of the flow diving plate only when the upper surface part slightly bends by receiving the load of the pot. The load receiving part additionally supports the load of the pot through the abutting flow dividing plate. The load receiving part may support the load of the pot through the flow dividing plate. The flow dividing plate serves as a beam to make the shape of the upper surface part stable by decreasing deformation of the upper surface part. The flow dividing plate may include a beam on a rear surface. Without the flow dividing plate, the upper surface part on which a heavy pot is put may bend, which causes inconvenience to movement of the water reservoir. The flow dividing plate also has functions of flow dividing and a cover. Reinforcing materials such as ribs may be provided under the flow dividing plate.

In yet a further aspect of the present disclosure, an upper surface of the load receiving part abuts on a lower surface of the flow dividing plate and the flow dividing plate has a raised center.

In yet a further aspect of the present disclosure, a circumferential groove surrounding the drain hole is formed in rear faces of the upper surface part and the flow dividing plate.

Advantageous Effects

According to the aspect of the present disclosure, the pot stand supports the load of the pot by the load receiving part and collects the water drained from the pot irrespective of the weight of the pot. The structure is simple thereby saving the manufacturing cost.

According to the aspect of the present disclosure, the load receiving part with a simple structure is constituted.

According to the aspect of the present disclosure, the flow dividing plate divides the flow of water drained from a bottom hole of the pot and allows the water to fall downward. The flow dividing plate covers over the load receiving part, thereby preventing leakage of the water flowing along a rear surface of the upper surface part or the load receiving part.

According to the aspect of the present disclosure, the load bearing capacity of the load receiving part is improved.

According to the aspect of the present disclosure, the water reservoir is prevented from interfering with the load receiving part and arranged in an appropriate position in an interior space of the main body, thereby improving arrangement efficiency.

According to the aspect of the present disclosure, the water from the pot is received even when the water reservoir is taken out from the main body.

BRIEF DESCRIPTION OF DRAWINGS

FIGS. 4a and 4b are diagrams illustrating a main body and the water reservoir (in the pulled-out state) according to the first embodiment of the present disclosure, wherein FIG. 4a is a perspective view and FIG. 4b is a plan view;

FIGS. 5a and 5b are diagrams illustrating the main body and the water reservoir (in a contained state) according to the first embodiment of the present disclosure, wherein FIG. 5a is a perspective view and FIG. 5b is a plan view;

FIGS. 6a and 6b are diagrams illustrating the pot stand with the water reservoir removed according to the first embodiment of the present disclosure, wherein FIG. 6a is a perspective view and FIG. 6b is a perspective view from another angle;

FIGS. 9a and 9b are diagrams illustrating the water reservoir according to the first embodiment of the present disclosure, wherein FIG. 9a is a perspective view and FIG. 9b is a plan view;

DESCRIPTION OF EMBODIMENTS

Figure 1:
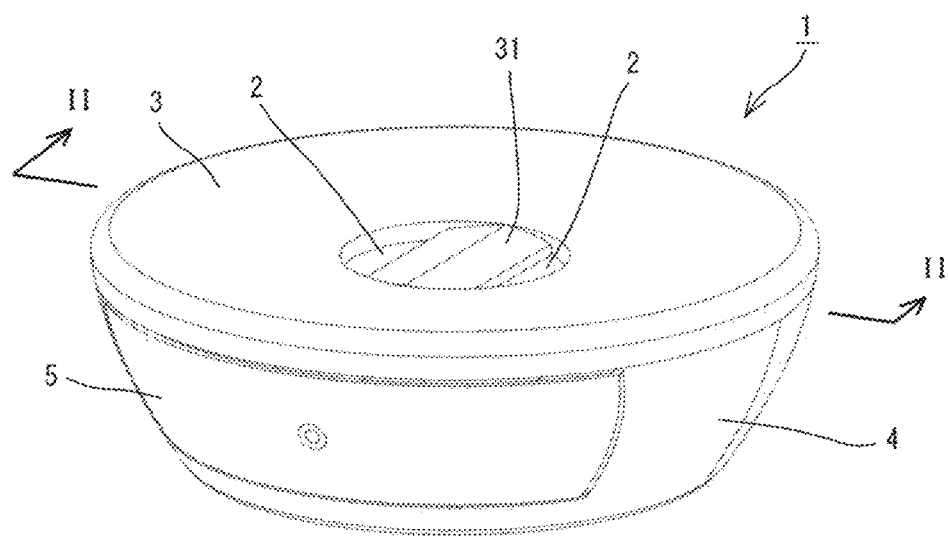
FIG. 1 is a perspective view illustrating a pot stand according to a first embodiment of the present disclosure.
Figure 2A:
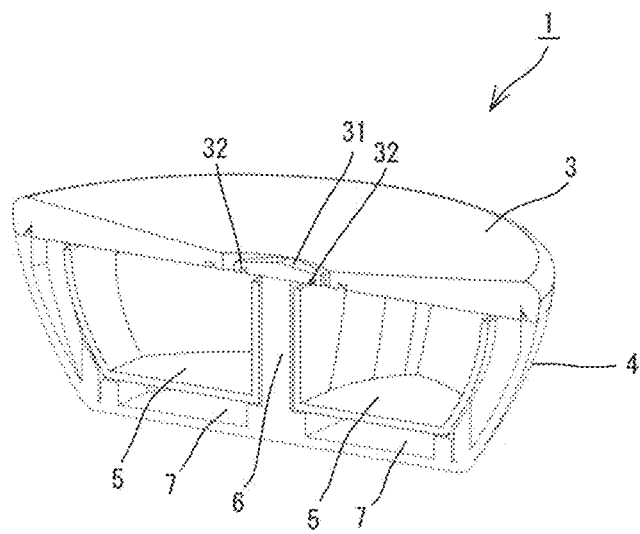
FIG. 2a is a cross-sectional view taken on a line II-II of FIG. 1.
Figure 2B:
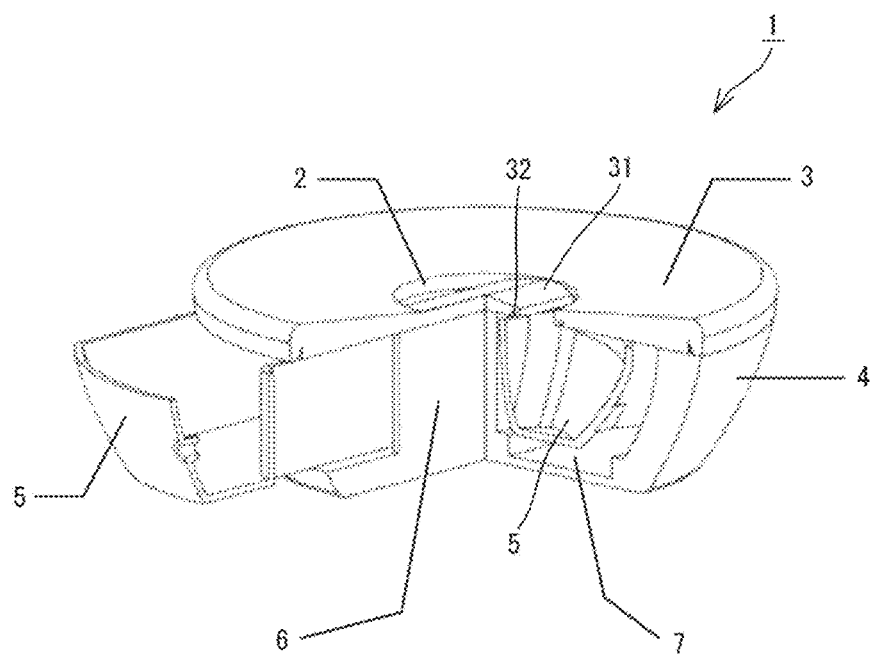
FIG. 2b is a perspective view illustrating an interior of the pot stand according to the first embodiment of the present disclosure.
Figure 3:
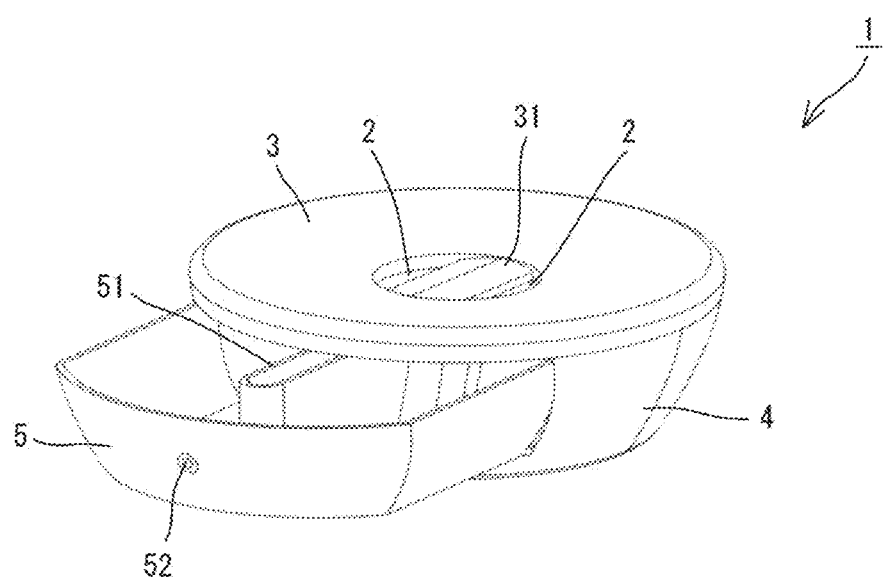
FIG. 3 is a perspective view illustrating the pot stand according to the first embodiment of the present disclosure in a pulled-out state of a water reservoir.

The following describes a pot stand 1 according to a first embodiment of the present disclosure with reference to FIGS. 1 to 11 of appended drawing.

The pot stand 1 includes a main body 4 having an upper surface part 3, a side surface part 42 and a bottom surface part 41. The upper surface part 3 has a drain hole 2 (hereinafter referred to as the hole 2). The side surface part 42 supports the upper surface part 3 and defines a space 43 that is opened upward. The side surface part 42 is connected to the bottom surface part 41. The pot stand 1 further includes an opening 44 that is formed in a part of the side surface part 42 and ribs 45 that are provided in an inner side of the main body 4. The pot stand 1 further includes a water reservoir 5 and a load receiving part 6 (hereinafter referred to as the receiving part 6). The water reservoir 5 is slidable through the opening 44 to be taken in and out from the space 43. The receiving part 6 is standing wall-like shaped and extends from the bottom surface part 41 in the space 43.

The upper surface part 3 is curved in a mortar shape, and is inwardly inclined downward from an outer periphery of the upper surface part 3 to a periphery of the hole 2. The inclination angle of the upper surface part 3 is preferably in a range of 2 to 6 degrees in consideration of drainage efficiency and the like.

Figure 7A:
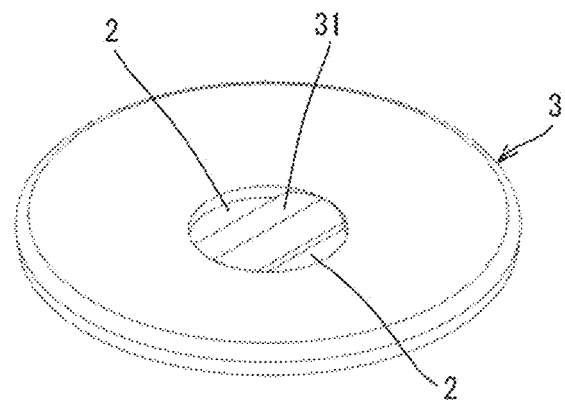
FIGS. 7a and 7b are perspective views of an upper surface part and FIG. 7c is a diagram illustrating a rear surface of the upper surface part according to the first embodiment of the present disclosure.
Figure 7B:
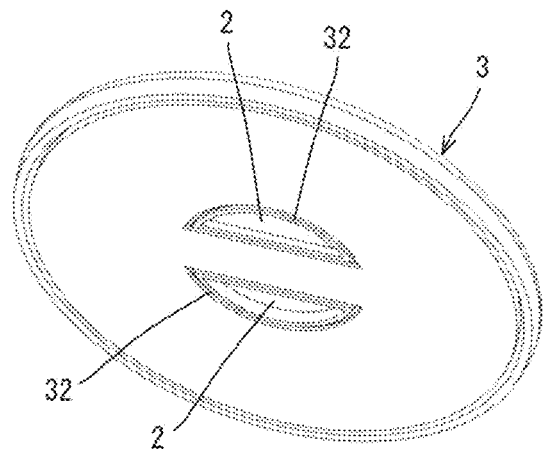
Figure 7C:
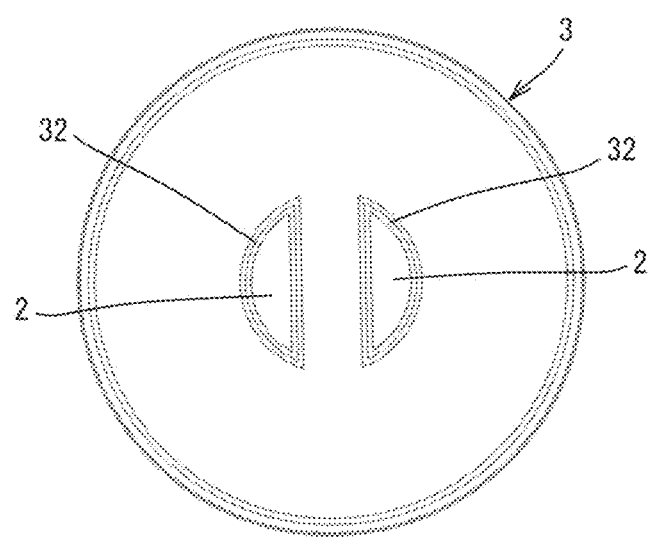
Figure 8:
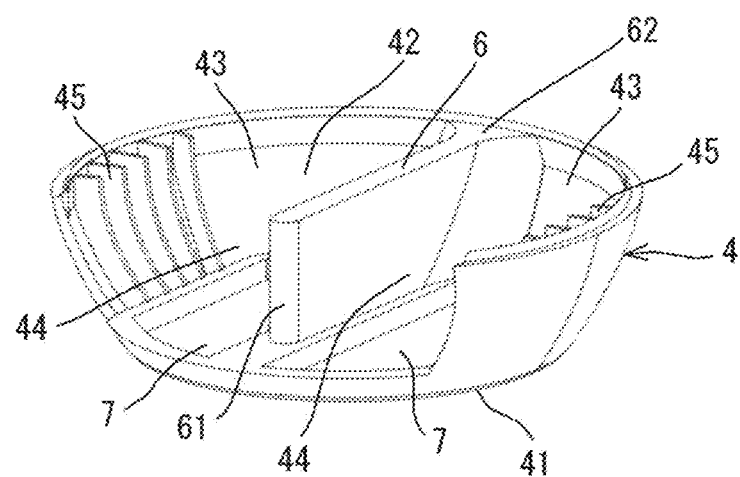
FIG. 8 is a perspective view illustrating the main body according to the first embodiment of the present disclosure.
Figure 9A:
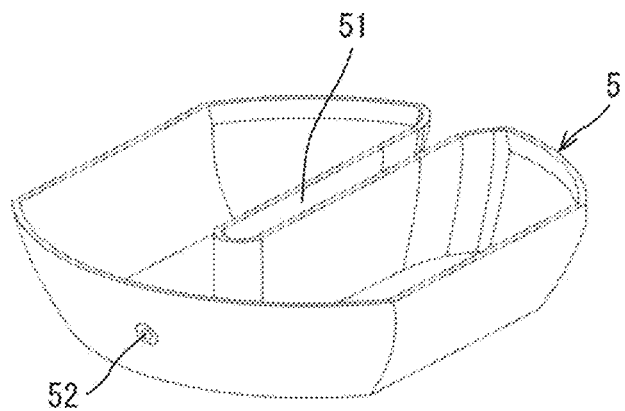
Figure 9B:
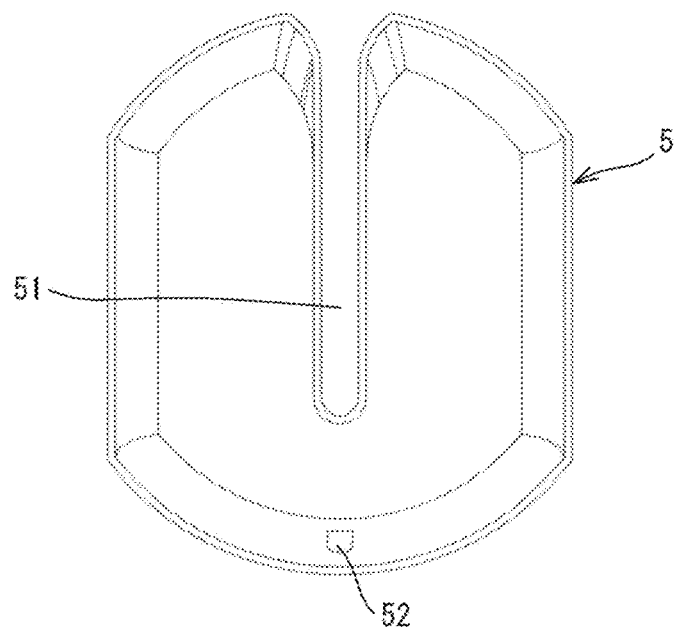

The hole 2 of the upper surface part 3 is divided into a plurality of holes (two holes, for example) by a flow dividing plate 31 (hereinafter referred to as the plate 31) that is mounted across the hole 2. The plate 31 has a raised center along a longitudinal direction of the plate, and is positioned to cover over the receiving part 6. The plate 31 has an inclination downward toward the hole 2 from a top surface of the raised center to avoid accumulation of drained water on the upper surface part 3. As shown in FIG. 7c, the upper surface part 3 and the plate 31 have circumferential grooves 32 in a half-moon shape around the hole 2 on their rear surfaces. The circumferential grooves 32 allow the drained water to fall into the water reservoir 5 without leakage to the outside of the water reservoir 5 along the rear surface of the upper surface part 3.

The main body 4 has a bottomed spherical shape with a top end removed.

The main body 4 may be used individually, or may take various forms including a part of furniture such as cabinets or bookcases and a form equipped with casters.

The receiving part 6 is formed in the main body 4 to extend along a take-out direction H of the water reservoir 5 (refer to FIGS. 4a and 4b) and vertically from a middle of the bottom surface part 41. The receiving part 6 has a horizontal top surface which abuts on a lower surface of the upper surface part 3 to receive and support the load of the pot 8 through the upper surface part 3. The receiving part 6 is a rib that has dimensions in a longitudinal direction, width direction, and height direction. The receiving part 6 may have a column shape with a certain diameter and height. The receiving part 6 has a thickness set to be 2 to 11 times larger than a thickness of the side surface part 42 to improve the load bearing capacity. The receiving part 6 has a free distal end 61 and a proximal end 62 with an increased thickness.

Figure 4A:
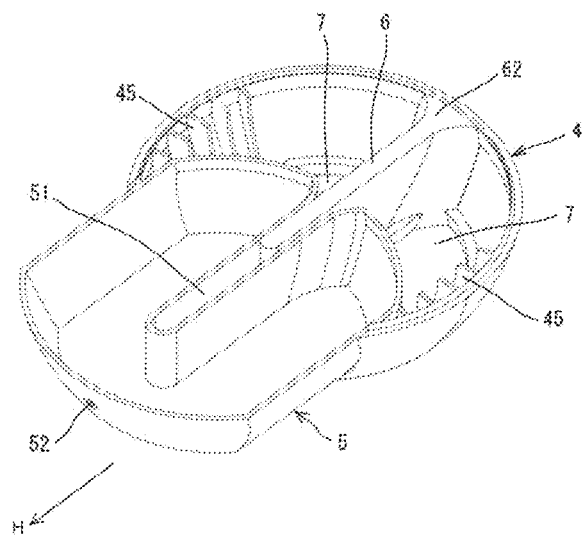
Figure 4B:
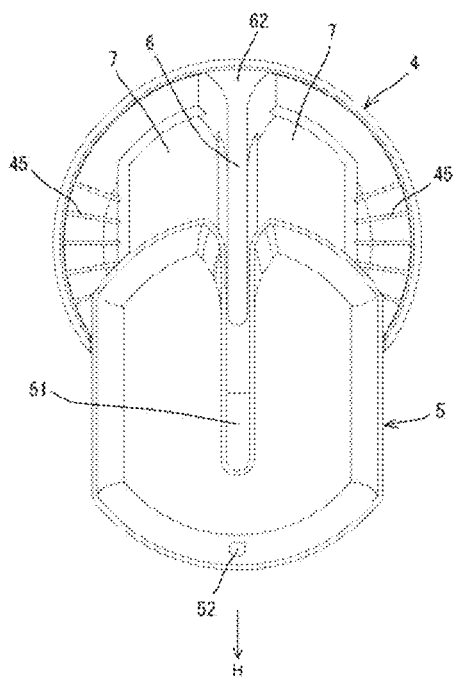
Figure 5A:
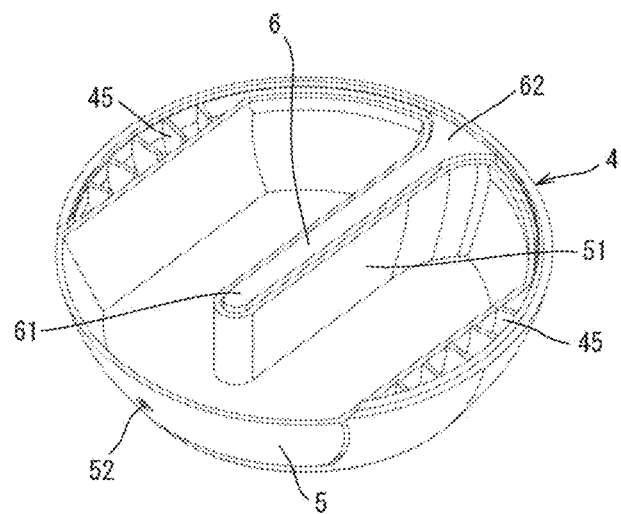
Figure 5B:
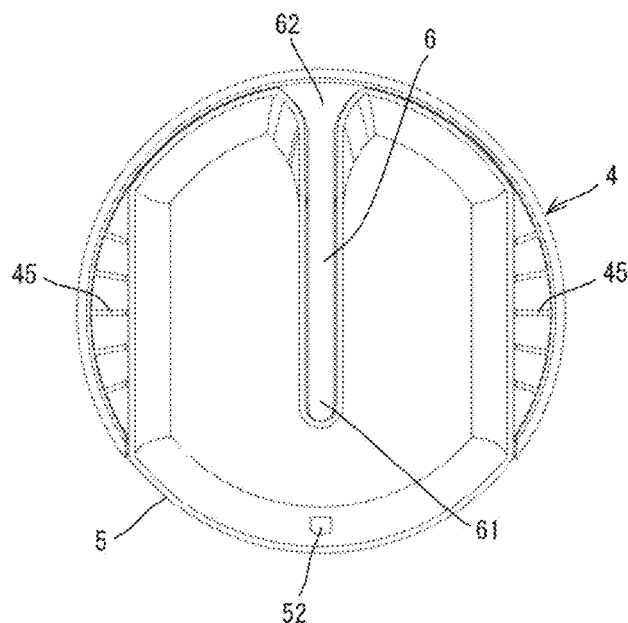
Figure 6A:
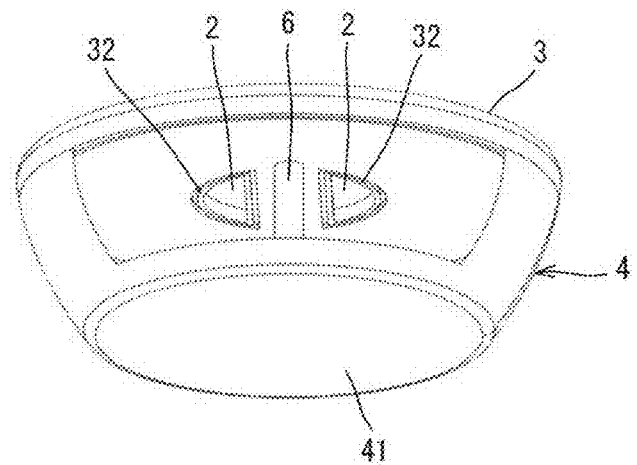
Figure 6B:
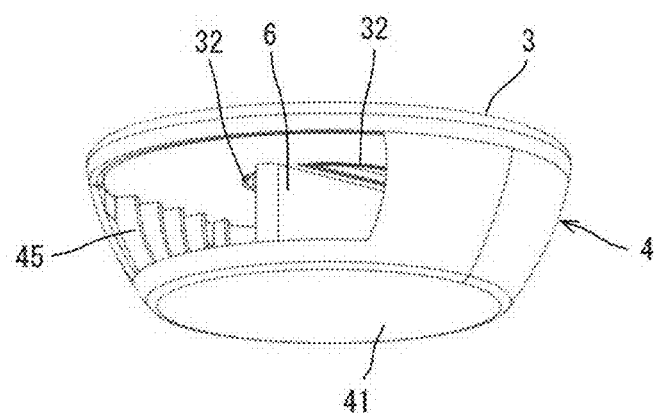

As shown in FIGS. 4a and 4b, the water reservoir 5 is provided with a long groove 51 that fits to the receiving part 6. The long groove 51 is formed to correspond to the receiving part 6 and has a similar U-shape. The long groove 51 is formed by recessing a wall of the water reservoir 5 inwardly. The receiving part 6 fits in an inner space of the long groove 51. This enables the water reservoir 5 to be accommodated in the main body 4 without interfering with the receiving part 6. This also allows improved sliding movement of the water reservoir 5. The water reservoir 5 has a hole 52 at a front face to mount a knob. The upper surface part 3 is not supported by a column right below a position where a stress is generated at a front side of the water reservoir 5, which generates a downward bending moment to the upper surface part 3. The plate 31 has a function of a beam to enhance the rigidity of the upper surface part 3 thereby reducing bending of the upper surface part 3.

The number of the receiving part 6 is not limited to one but two receiving parts 6 or more may be provided. The weights of the upper surface part 3 and the pot 8 are supported by upper surfaces of the side surface part 42 and the receiving part 6.

The bottom surface part 41 includes recessed grooves 7 on its upper surface. The recessed grooves 7 are formed to be recessed more than the upper surface of the bottom surface part 41. The recessed grooves 7 are provided in the main body 4 to supplementary reserve the drained water when the water reservoir 5 is taken out for drain disposition.

Figure 10:
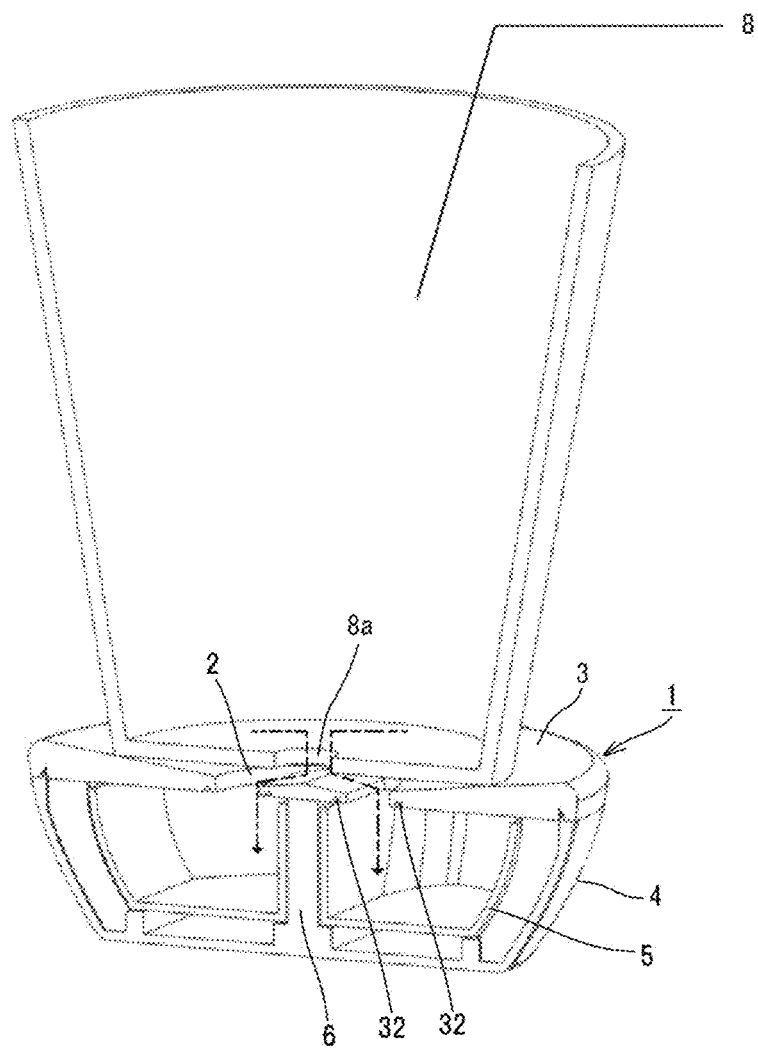
FIG. 10 is a reference cross-sectional diagram showing the pot stand in a first use mode according to the first embodiment of the present disclosure.
Figure 11:
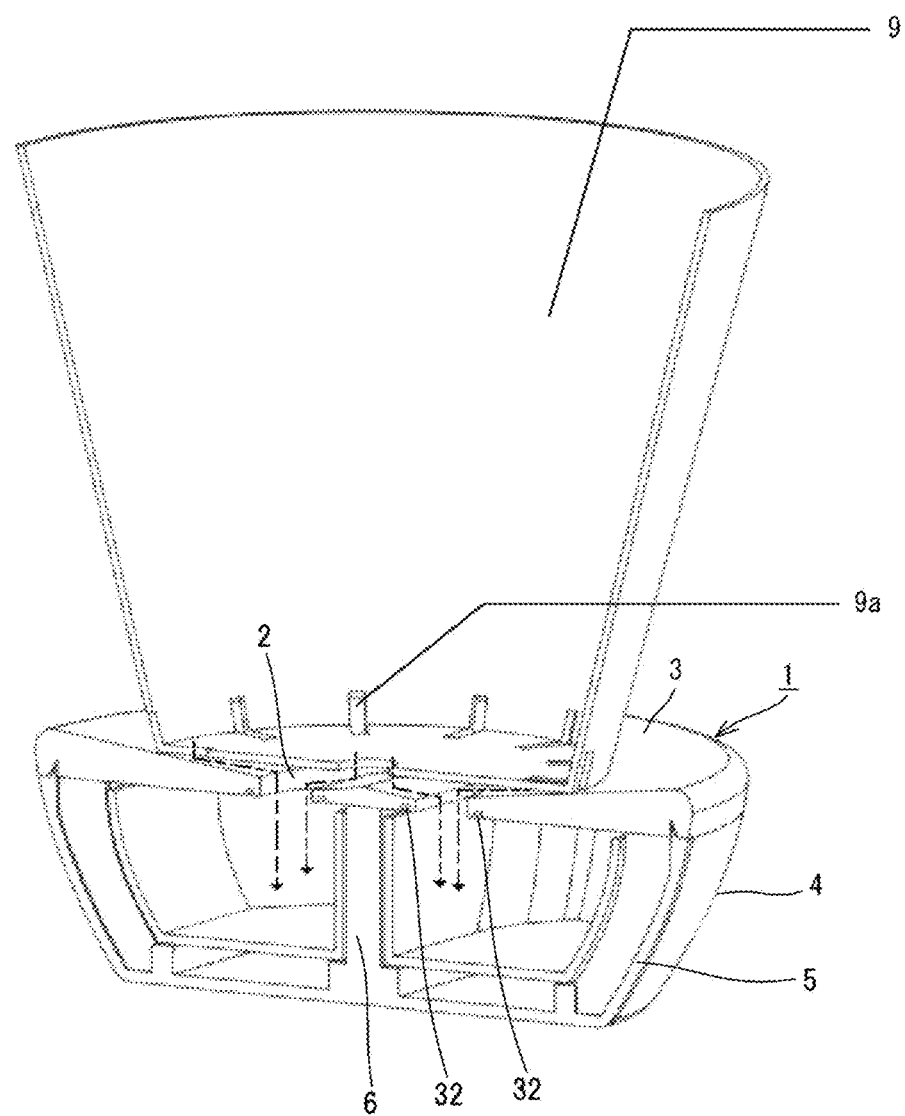
FIG. 11 is a reference cross-sectional diagram showing the pot stand in a second use mode according to the first embodiment of the present disclosure.

The following describes a using method of the pot stand 1. Chained lines in FIGS. 10 and 11 show flows of the drained water. The water drained from a bottom hole 8a or slits 9a of the pots 8 and 9 falls on the surface of the upper surface part 3 down into the water reservoir 5 that is positioned in the main body 4 through the hole 2 of the upper surface part 3. The upper surface part 3 and the plate 31 of the upper surface part 3 have inclination structures to avoid the drained water left on the upper surface part 3.

As shown in FIG. 10, the pot 8 typically includes the bottom hole 8a. The pot stand 1 can be adopted to pots having various types of holes including the pot 9 with the slits 9a on its bottom periphery, as shown in FIG. 11. The pot stand 1 is adaptable to various drain holes of pots to the extent that the bottom surfaces of the pots 8, 9 lie within the outer periphery of the upper surface part 3.

When the pot 8 is positioned on the upper surface part 3, the load of the pot 8 applied to the upper surface part 3 is supported by the upper surface of the receiving part 6. The drained water running along the rear surface of the upper surface part 3 is blocked by the circumferential grooves 32 to fall downward. After watering to the pot 8, the water drained from the bottom hole 8a of the pot 8 flows on the upper surface part 3 into the water reservoir 5 through the hole 2 and the plate 31 and is reserved in the water reservoir 5. The water reservoir 5 is adequately taken out to throw away the reserved water in consideration of various factors including the size of the pot and the type of soil in the pot 8 while observing the water reserved in the water reservoir 5. The drained water is reserved in the recessed grooves 7 while the water reservoir 5 is taken out.

The pot stand 1 of the first embodiment described above has following advantageous effects.

The pot stand 1 supports the load of the pot 8 by the receiving part 6 and receives the drained water irrespective of the weight of the pot 8. The structure of the pot stand 1 is simple, thereby saving the manufacturing cost.

The plate 31 divides the flow of the water drained from the bottom hole 8a and allows the water to fall downward. The plate 31 covers over the receiving part 6 and is provided with the circumferential grooves 32, thereby preventing water leakage along the rear surface of the upper surface part 3 and the receiving part 6.

The water drained from the pot 8 is received by the recessed grooves 7 while the water reservoir 5 is taken out from the main body 4, thereby improving the water reserving effect.

The thickness of the receiving part 6 is larger than the thickness of the side surface part 42, thereby enhancing the load bearing capacity of the receiving part 6.

The water reservoir 5 is prevented from interfering with the receiving part 6 and positioned appropriately in the inner space of the main body 4, thereby improving arrangement efficiency.

Figure 12:
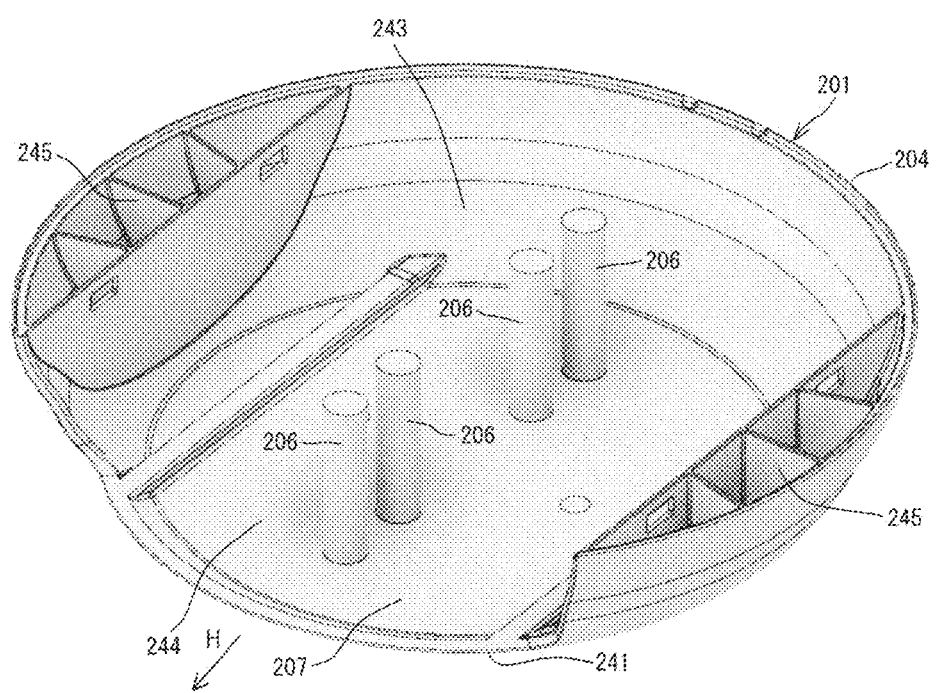
FIG. 12 is a perspective view illustrating a main body of a pot stand according to a second embodiment of the present disclosure.

The following describes a pot stand 201 according to a second embodiment with reference to FIG. 12. The features of the pot stand 201 are the same as those in the first embodiment except that the wall-shaped receiving part 6 is modified to column-shaped receiving parts 206. The receiving parts 206, each of which is formed cylindrically, are arranged along the take-out direction H.

The following describes a pot stand 301 according to a third embodiment with reference to FIGS. 13a, 13b, 14 and 15. The upper surface part 3 of the first embodiment has the planar lower surface. The pot stand 301 of the present embodiment is modified from the pot stand 1 of the first embodiment in that a lower surface of an upper surface part 303 is recessed in an upward direction excluding positions corresponding to an outer periphery of the upper surface part 303, an periphery of a hole 302 (including an outer periphery and rear surface of a plate 331) and ribs. The other structures are the same as those in the first embodiment. The corresponding members to the first embodiment are denoted by like reference signs in the 300s.

Figure 13A:
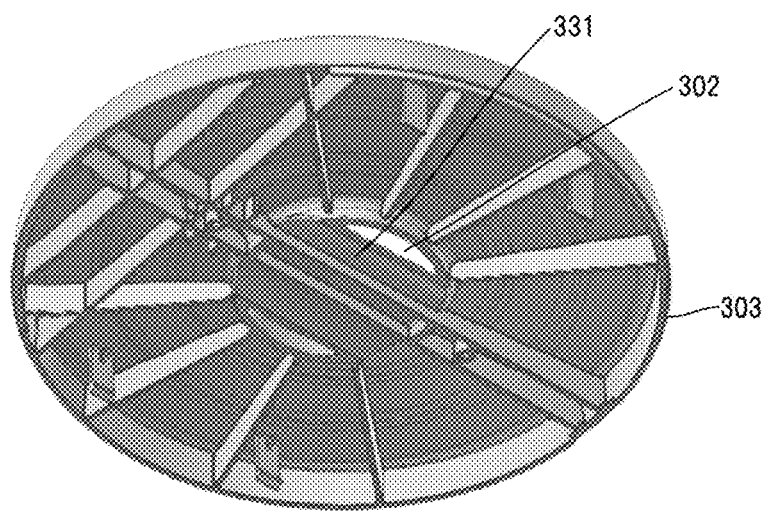
FIG. 13a is a perspective view illustrating an upper surface part of a pot stand according to a third embodiment of the present disclosure and FIG. 13b is a reference cross-sectional diagram showing s flow of water in the pot stand according to the third embodiment of the present disclosure.
Figure 13B:
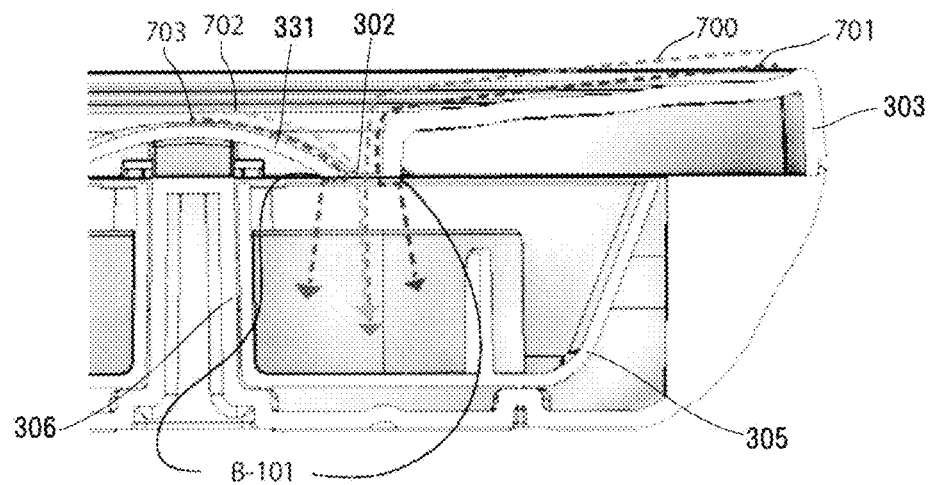

In the first embodiment, the lower surface of the upper surface part 3 is planar and is provided with the circumferential grooves 32 to prevent leakage of the drained water along the rear surface of the upper surface part 3 to the outside of the water reservoir 5. The upper surface part 303 of the third embodiment, on the other hand, has the upwardly recessed shape excluding positions corresponding to the outer periphery of the upper surface part 303, the periphery of the hole 302 and the ribs, as shown in FIG. 13a. This causes flows of the drained water 700 to 703 in FIG. 13b so that the water is reserved in the water reservoir 305 without forming the circumferential grooves. The drained water running along a rear surface B-101 of the upper surface part 303 falls downward at points that the rear surface B-101 breaks off, as is shown with the flows 701 and 703.

Figure 14:
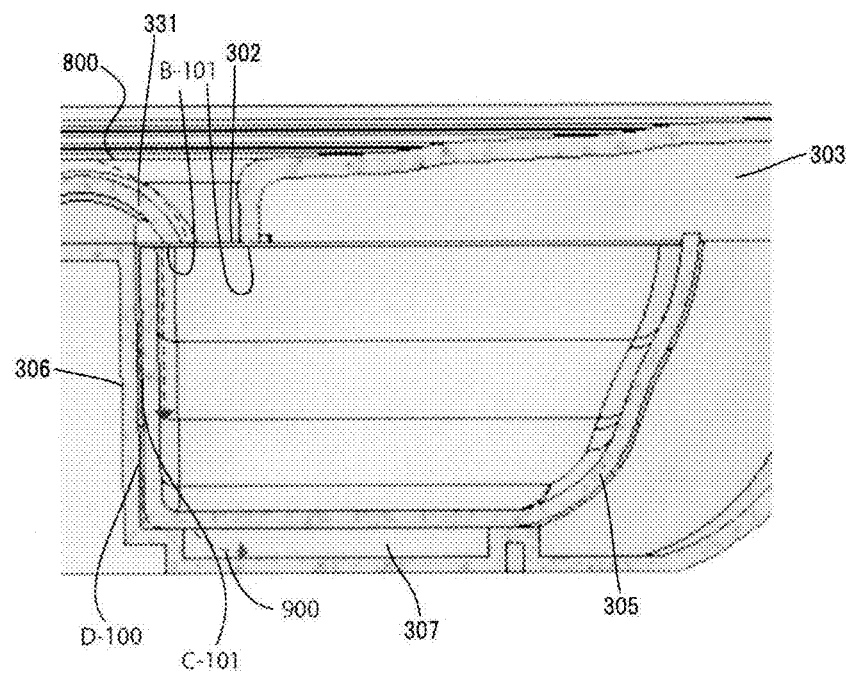
FIG. 14 is a reference cross-sectional diagram showing a flow of water that causes water leakage in the pot stand according to the third embodiment of the present disclosure.

As shown in FIG. 14, when a point of the periphery of the hole 302 at the shortest distance from a receiving part 306 (an end portion of the plate 331 in FIG. 14) is adjacent to the receiving part 306, a part of the drained water flowing along the rear surface B-101 of the plate 331 leaks to the outside of the water reservoir 305 through a gap between an outer surface D-100 of the receiving part 306 and an outer surface C-101 of an outer circumferential wall of the water reservoir 305, as shown with a flow 800, which causes water leakage 900. The water leakage 900 is reserved in recessed grooves 307.

Figure 15:
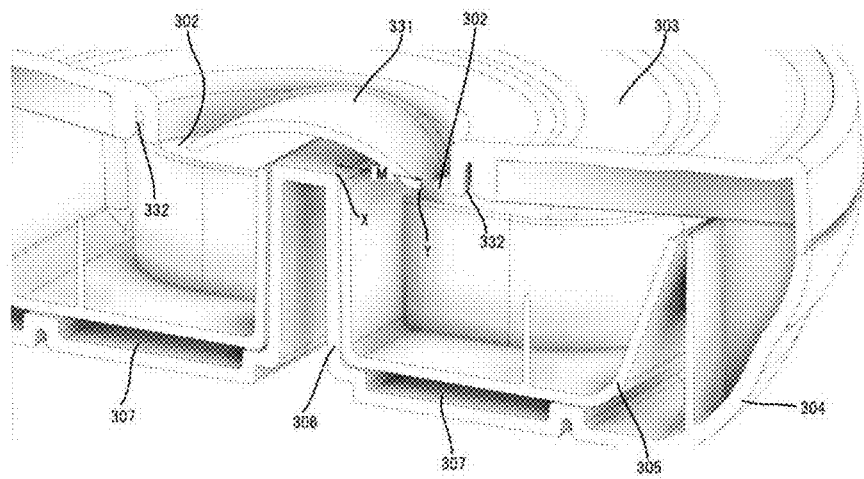
FIG. 15 is a cross-sectional perspective view showing a relation of a distance between a drain hole and a load receiving part of the pot stand according to the third embodiment of the present disclosure.

To appropriately allow the water to fall downward into the water reservoir 5, a distance M in FIG. 15 is 5 mm or more, and preferably 10 mm or more, for example 16 mm. The distance M is defined as a distance between the receiving part 306 and a point of the periphery of the hole 302 at the shortest distance from the receiving part 306 and is illustrated as the distance between a point X and a point Y in FIG. 15. It goes without saying that the maximum value of the distance M is smaller than the radius of the upper surface part 303, however, there is no other inherent limitation and the distance M is appropriately selected in consideration of the sizes of the hole 302 and the upper surface part 303. A circumferential groove 332 may be additionally formed to avoid leakage of the drained water to the outside of the water reservoir 305 along the ribs, as shown in FIG. 15. As mentioned above, leakage of the drained water to the outside of the water reservoir along the rear surface of the upper surface part 303 is prevented by keeping a distance between the hole 302 and the receiving part 306 or forming a concave portion and a convex portion on the rear surface of the upper surface part 303.

Figure 16A:
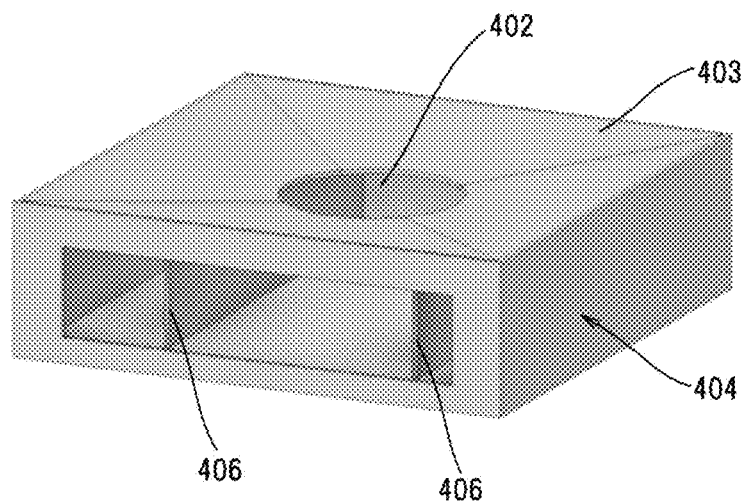
FIG. 16a is a perspective view illustrating a main body of a pot stand and FIG. 16b is a plan view showing a relation of a distance between a drain hole and a load receiving part, according to a fourth embodiment of the present disclosure.
Figure 16B:
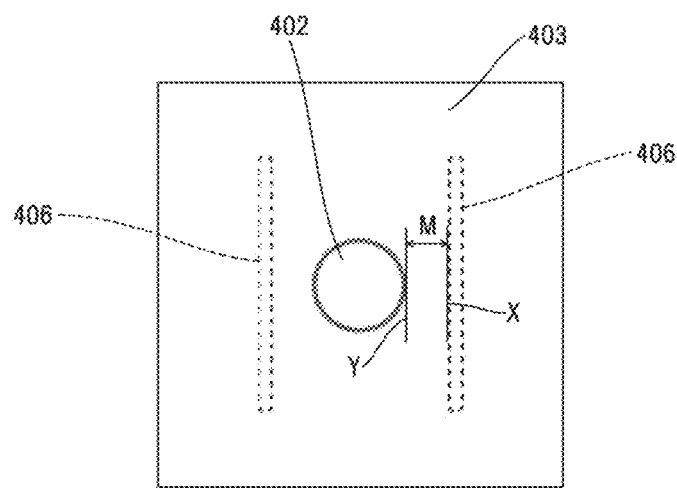

The following describes a pot stand 401 according to a fourth embodiment with reference to FIGS. 16a and 16b. In the fourth embodiment, the pot stand 401 includes a main body 404 with a rectangular parallelepiped shape and two receiving parts 406 arranged separately at two right and left positions without forming the flow dividing plate. The embodiment where the receiving parts 406 are arranged at two right and left positions as in the fourth embodiment may include an upper surface part 403 with a lower surface having an upwardly recessed shape corresponding to positions excluding the outer periphery of the upper surface part 403, the periphery of the hole 402 and the ribs as in the third embodiment. In such a case, water leakage to the outside of the water reservoir 505 (not shown in the figure) is prevented by separating the shortest distance M (refer to FIG. 16b) between the periphery of a hole 402 and the receiving parts 406 by 5 mm or more, and preferably by 10 mm or more, for example 16 mm. The illustration and description of the water reservoir should refer to the first to third embodiments and is thus omitted.

The present disclosure is not limited to the above embodiments. Various modifications, changes and additions can be made without departing from a scope of the technical ideas of the present disclosure. Modifications and equivalents thereof are also included in the technical scope of the present disclosure.

REFERENCE SIGNS LIST 1, 201, 301, 401 . . . pot stand
2 . . . drain hole
3 . . . upper surface part
31 . . . flow dividing plate
32 . . . circumferential groove
4 . . . main body
41 . . . bottom surface part
42 . . . side surface part
43 . . . space
44 . . . opening
45 . . . rib
5 . . . water reservoir
51 . . . long groove
52 . . . hole
6 . . . load receiving part
7 . . . recessed groove
8, 9 . . . pot

What is claimed is:

1. A pot stand, comprising
a main body comprising an upper surface part that has a drain hole, a side surface part that is located below the upper surface part and a bottom surface part that is located below the side surface part, and including an opening in a part of the side surface part,
a water reservoir that is positioned in the opening in the part of the side surface part of the main body and is configured to be movably taken out with respect to the main body, and
a load receiving part that supports a load of a pot through the upper surface part,
wherein the load receiving part has a wall shape and extends vertically with respect to the bottom surface part along the take-out direction of the water reservoir, and
wherein the water reservoir includes a long groove that is formed by recessing a wall of the water reservoir inwardly at back side, and the load receiving part fits in an inner space of the long groove in a state of the water reservoir being accommodated in the main body.

2. The pot stand according to claim 1, wherein the long groove has a corresponding shape to the load receiving part in a plan view.

3. The pot stand according to claim 1, further comprising a flow dividing plate that is mounted in the drain hole of the upper surface part to cover over the load receiving part, wherein the flow dividing plate is configured to divide drained water and allow the water to fall down to the water reservoir.

4. The pot stand according to claim 3, wherein an upper surface of the load receiving part abuts on a lower surface of the flow dividing plate and wherein the flow dividing plate has a raised center.

5. The pot stand according to claim 3, wherein a circumferential groove that surrounds the drain hole is formed in rear faces of the upper surface part and the flow dividing plate.

6. A pot stand, comprising:
- a main body comprising an upper surface part that has a drain hole, a side surface part that is located below the upper surface part and a bottom surface part that is located below the side surface part, and including an opening in a part of the side surface part,
- a water reservoir that is positioned in the opening in the part of the side surface part of the main body and is configured to be movably taken out with respect to the main body, and
- a load receiving part that supports a load of a pot through the upper surface part,
- wherein the load receiving part has a column shape which extends vertically with respect to the bottom surface part along the take-out direction of the water reservoir, and
- wherein the water reservoir includes a long groove that is formed by recessing a wall of the water reservoir inwardly at back side, and the load receiving part fits in an inner space of the long groove in a state of the water reservoir being accommodated in the main body.

7. The pot stand according to claim 6, further comprising a flow dividing plate that is mounted in the drain hole of the upper surface part to cover over the load receiving part, wherein the flow dividing plate is configured to divide drained water and allow the water to fall down to the water reservoir.

8. The pot stand according to claim 7, wherein an upper surface of the load receiving part abuts on a lower surface of the flow dividing plate and wherein the flow dividing plate has a raised center.

9. The pot stand according to claim 7, wherein a circumferential groove that surrounds the drain hole is formed in rear faces of the upper surface part and the flow dividing plate.

* * * * *